(12) United States Patent
Maruyama et al.

(10) Patent No.: US 9,171,218 B2
(45) Date of Patent: Oct. 27, 2015

(54) IMAGE PROCESSING APPARATUS, IMAGE PROCESSING METHOD, AND COMPUTER READABLE MEDIUM THAT RECOGNIZE OVERLAPPING ELEMENTS IN HANDWRITTEN INPUT

(75) Inventors: Kosuke Maruyama, Kanagawa (JP); Shunichi Kimura, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 525 days.

(21) Appl. No.: 13/454,287

(22) Filed: Apr. 24, 2012

(65) Prior Publication Data

US 2013/0136360 A1 May 30, 2013

(30) Foreign Application Priority Data

Nov. 24, 2011 (JP) .................. 2011-255759

(51) Int. Cl.
*G06K 9/34* (2006.01)
*G06K 9/20* (2006.01)
*G06K 9/00* (2006.01)
*G06K 9/22* (2006.01)

(52) U.S. Cl.
CPC .............. *G06K 9/20* (2013.01); *G06K 9/00416* (2013.01); *G06K 9/222* (2013.01); *G06K 9/34* (2013.01)

(58) Field of Classification Search
None
See application file for complete search history.

(56) References Cited

U.S. PATENT DOCUMENTS 5,321,768 A * 6/1994 Fenrich et al. ................ 382/178

FOREIGN PATENT DOCUMENTS

| JP | 06-075795 A | 3/1994 |
|---|---|---|
| JP | 06-124364 A | 5/1994 |
| JP | 08-297720 A | 11/1996 |
| JP | 09-022443 A | 1/1997 |
| JP | 10-091727 A | 4/1998 |
| JP | 2000-105798 A | 4/2000 |
| JP | 2001-184458 A | 7/2001 |
| JP | 2002-109471 A | 4/2002 |
| JP | 2002-109474 A | 4/2002 |

OTHER PUBLICATIONS

Office Action issued by Australian Patent Office in counterpart Australian Patent Application No. 2012203130, dated May 7, 2013.
Communication dated Jul. 21, 2015 from the Japanese Patent Office in counterpart application No. 2011-255759.

* cited by examiner

*Primary Examiner* — Thomas Conway
(74) *Attorney, Agent, or Firm* — Sughrue Mion, PLLC

(57) ABSTRACT

An image processing apparatus includes a reception unit, a determination unit, a handwriting separation unit, an image generation unit, an image recognition unit, and an output unit. The reception unit receives handwriting information. The determination unit determines whether first handwriting indicated by first handwriting information and second handwriting indicated by second handwriting information overlap each other on the basis of the handwriting information. The handwriting separation unit separates the first handwriting from the second handwriting by changing a first/second handwriting position in the first/second handwriting information when the determination unit has determined that the first and second handwriting overlap each other. The image generation unit generates an image from handwriting information obtained through the separation, and information regarding handwriting that has been determined not to overlap other handwriting. The image recognition unit recognizes the generated image. The output unit outputs the recognition result.

16 Claims, 15 Drawing Sheets

FIG. 4A

| COORDINATES | TIME |
|---|---|
| (54, 46) | 17:54:21.45 |
| (53, 45) | 17:54:22.12 |
| (52, 44) | 17:54:22.35 |
| (52, 43) | 17:54:23.05 |
| ... | ... |
| (52, 60) | 17:54:25.55 |

FIG. 4B

| COORDINATES | PEN UP/DOWN |
|---|---|
| (54, 46) | DOWN |
| (53, 45) | |
| (52, 44) | |
| (52, 43) | |
| ... | ... |
| (52, 60) | UP |

FIG. 4C

| COORDINATES | TIME | PEN UP/DOWN |
|---|---|---|
| (54, 46) | 17:54:21.45 | DOWN |
| (53, 45) | 17:54:22.12 | |
| (52, 44) | 17:54:22.35 | |
| (52, 43) | 17:54:23.05 | |
| ... | ... | ... |
| (52, 60) | 17:54:25.55 | UP |

| COORDINATES | PEN UP/DOWN |
|---|---|
| (54, 46) | DOWN |
| (53, 45) | |
| (52, 44) | |
| (52, 43) | |
| ... | ... |
| (52, 60) | UP |
| (40, 40) | DOWN |
| (40, 42) | |

410B  420B 510B (rows 1-5), 520B (rows 6-7)

| COORDINATES | TIME |
|---|---|
| (54, 46) | 17:54:21.45 |
| (53, 45) | 17:54:22.12 |
| (52, 44) | 17:54:22.35 |
| (52, 43) | 17:54:23.05 |
| ... | ... |
| (52, 60) | 17:54:23.55 |
| (40, 40) | 17:54:24.55 |
| (40, 42) | 17:54:24.60 |

410A  420A 510A (rows 1-5), 520A (rows 6-7)

FIG. 11
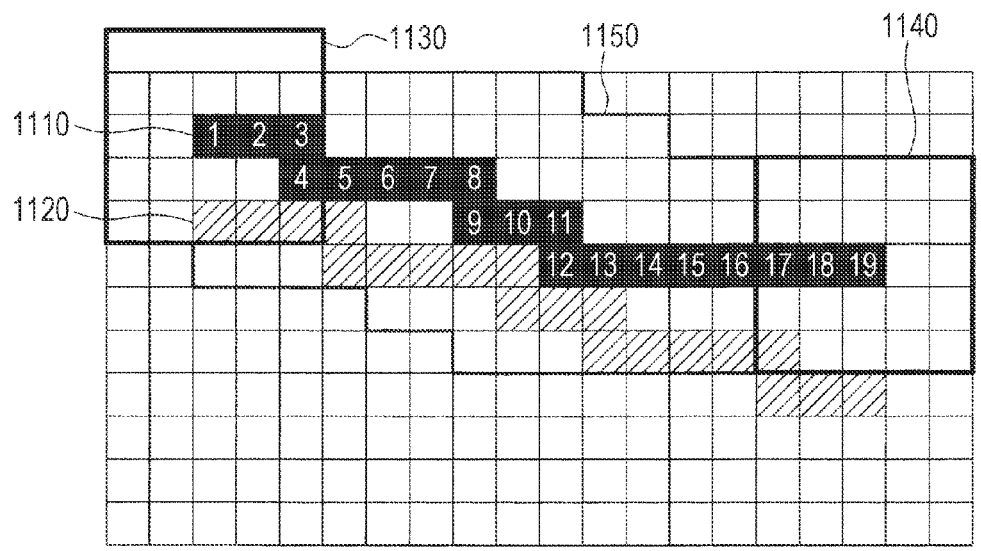
FIG. 12A
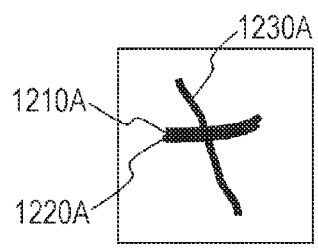
FIG. 12B
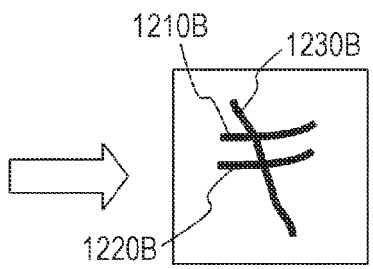
FIG. 12C

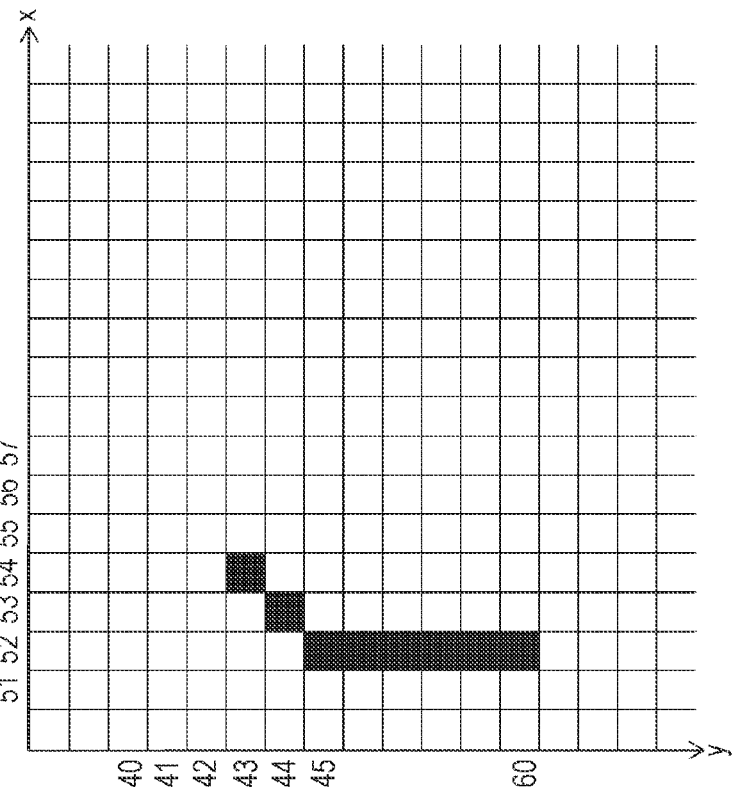

FIG. 18A
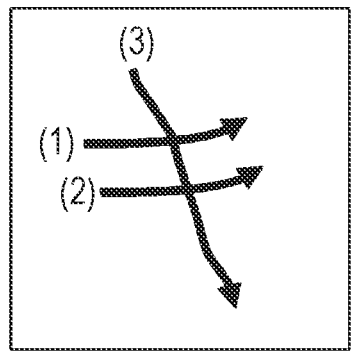
FIG. 18B
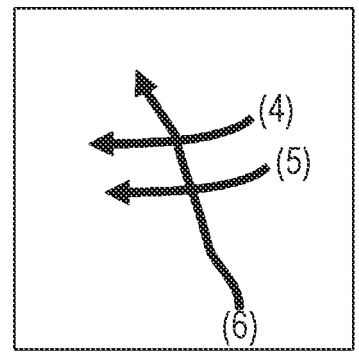
FIG. 19
| STROKE ORDER | ONLINE CHARACTER RECOGNITION |
|---|---|
| (1)→(2)→(3) | YES |
| (1)→(3)→(2) | NO |
| (1)→(2)→(6) | NO |
| (1)→(5)→(3) | NO |
| etc. | NO |

IMAGE PROCESSING APPARATUS, IMAGE PROCESSING METHOD, AND COMPUTER READABLE MEDIUM THAT RECOGNIZE OVERLAPPING ELEMENTS IN HANDWRITTEN INPUT

CROSS-REFERENCE TO RELATED APPLICATIONS

This application is based on and claims priority under 35 USC 119 from Japanese Patent Application No. 2011-255759 filed Nov. 24, 2011.

BACKGROUND (i) Technical Field

The present invention relates to an image processing apparatus, an image processing method, and a computer readable medium.

(ii) Related Art

Technologies for recognizing handwriting information have been proposed.

SUMMARY

The gist of the present invention is included in the following aspect of the present invention.

According to an aspect of the invention, there is provided an image processing apparatus including a reception unit, a determination unit, a handwriting separation unit, an image generation unit, an image recognition unit, and an output unit. The reception unit receives handwriting information. The determination unit determines whether or not first handwriting and second handwriting overlap each other on the basis of the handwriting information received by the reception unit. The first handwriting is indicated by first handwriting information, and the second handwriting is indicated by second handwriting information. The handwriting separation unit separates the first handwriting from the second handwriting by changing a first handwriting position included in the first handwriting information or a second handwriting position included in the second handwriting information when the determination unit has determined that the first handwriting and the second handwriting overlap each other. The image generation unit generates an image from handwriting information that is obtained through the separation performed by the handwriting separation unit, and information regarding handwriting that has been determined not to overlap other handwriting by the determination unit. The image recognition unit recognizes the image generated by the image generation unit. The output unit outputs a recognition result obtained by the image recognition unit.

BRIEF DESCRIPTION OF THE DRAWINGS

Exemplary embodiments of the present invention will be described in detail based on the following figures, wherein:

FIGS. 4A to 4C are diagrams for explaining exemplary data configurations of stroke information;

FIGS. 5A and 5B are diagrams for explaining exemplary processes of extracting one stroke;

FIG. 11 is a diagram for explaining an exemplary process of determining whether strokes overlap each other;

FIGS. 12A to 12C are diagrams for explaining an exemplary process of separating strokes from each other;

FIGS. 16A to 16C are diagrams for explaining an exemplary process of generating an image from stroke information;

FIGS. 18A and 18B are diagrams for explaining an exemplary process of performing recognition on handwriting by using stroke information;

FIG. 19 is a diagram for explaining an exemplary process of performing recognition on handwriting by using stroke information.

DETAILED DESCRIPTION

Various exemplary embodiments that are desirable when the present invention is implemented will be described below with reference to the drawings.

Figure 1:
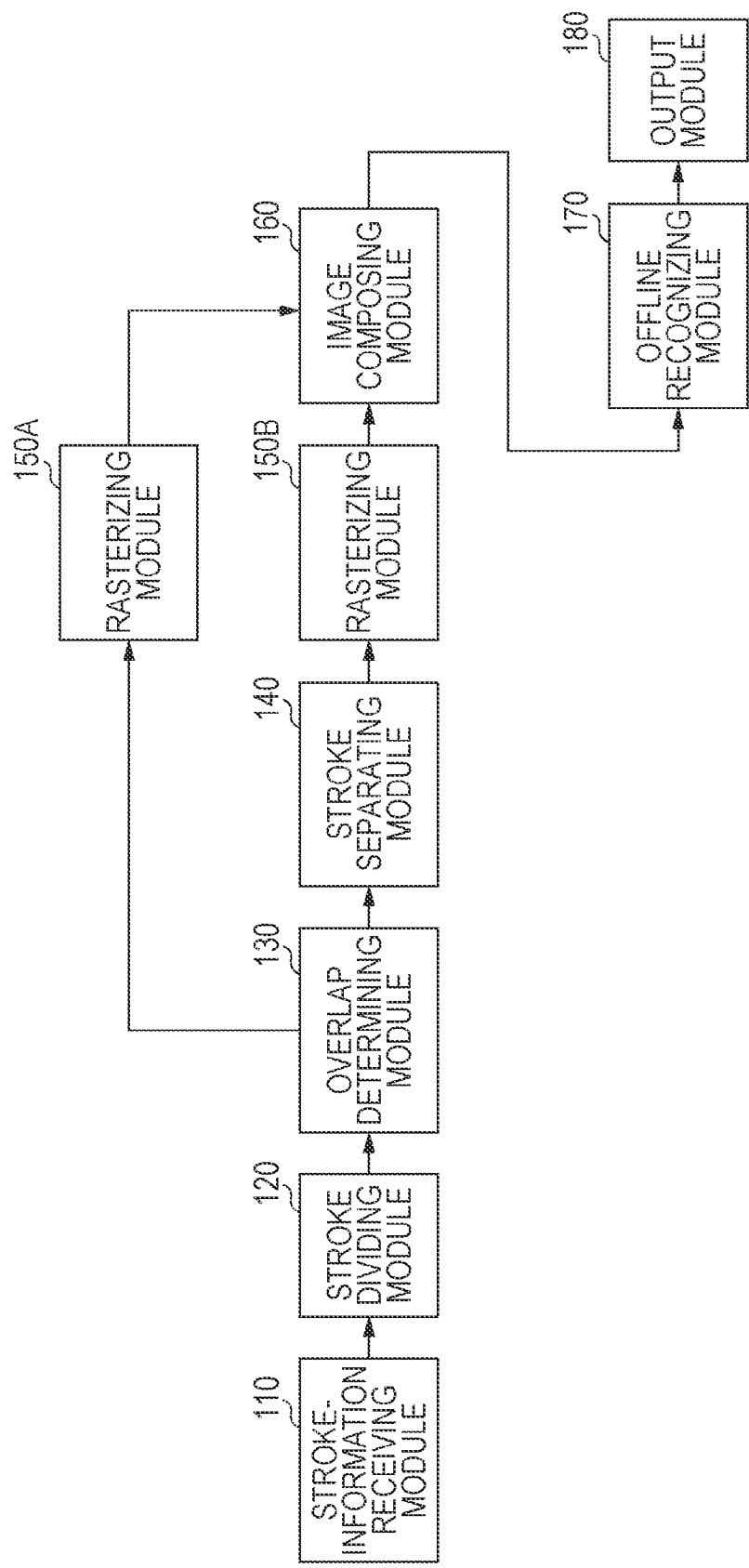
FIG. 1 is a schematic module configuration diagram illustrating an exemplary configuration according to a first exemplary embodiment of the invention.

FIG. 1 is a schematic module configuration diagram illustrating an exemplary configuration according to a first exemplary embodiment of the invention.

In general, a module refers to a component, such as software that is logically separable (a computer program) or hardware. Thus, a module in the exemplary embodiments refers to not only a module in terms of a computer program but also a module in terms of a hardware configuration. Consequently, the description of the module for the exemplary embodiments serves as the description of a system, a method, and a computer program which cause the hardware configuration to function as a module (a program that causes a computer to execute procedures, a program that causes a computer to function as a unit, or a program that causes a computer to implement functions). For convenience of explanation, the terms "to store something" and "to cause something to store something", and equivalent terms are used. These terms mean that a storage apparatus stores something or that a storage apparatus is controlled so as to store something when the exemplary embodiments are achieved as computer programs. One module may correspond to one function. However, in the implementation, one module may constitute one program, or multiple modules may constitute one program. Alternatively, multiple programs may constitute one module. Additionally, multiple modules may be executed by one computer, or one module may be executed by multiple computers in a distributed or parallel processing environment. One module may include another module. Hereinafter, the term "connect" refers to logical connection, such as transmission/reception of data or an instruction, or reference relationship between pieces of data, as well as physical connection. The term "predetermined" refers to a state in which determination has been made before a target process. This term also includes a meaning in which determination has been made in accordance with the situation or the state at or before the time point when the determination was to be made, not only before processes according to the exemplary embodiments start, but also before the target process starts even after the processes according to the exemplary embodiments have started. A description having a meaning of "when A is satisfied, B is performed" is used as a meaning in which whether or not A is satisfied is determined and, when it is determined that A is satisfied, B is performed. However, this term does not include a case where the determination of whether or not A is satisfied is unnecessary.

A system or an apparatus refers to one in which multiple computers, hardware, devices, and the like are connected to each other by using a communication unit such as a network which includes one-to-one communication connection, and also refers to one which is implemented by using a computer, hardware, a device, or the like. The terms "apparatus" and "system" are used as terms that are equivalent to each other. As a matter of course, the term "system" does not include what is nothing more than a social "mechanism" (social system) which is constituted by man-made agreements.

In each of the processes corresponding to modules, or in each of the processes included in a module, target information is read out from a storage apparatus. After the process is performed, the processing result is written in a storage apparatus. Accordingly, description about the readout from the storage apparatus before the process and the writing into the storage apparatus after the process may be skipped. Examples of the storage apparatus may include a hard disk, a random access memory (RAM), an external storage medium, a storage apparatus via a communication line, and a register in a central processing unit (CPU).

An image processing apparatus according to the first exemplary embodiment of the invention, which recognizes an image generated from handwriting information, includes a stroke-information receiving module 110, a stroke dividing module 120, an overlap determining module 130, a stroke separating module 140, a rasterizing module 150A, a rasterizing module 150B, an image composing module 160, an offline recognizing module 170, and an output module 180, as illustrated in the example in FIG. 1.

Examples of handwriting to be recognized include a character, graphics, and a gesture (also referred to as an instruction to a computer or an action). In the following example, the description will be chiefly made using a character as handwriting to be recognized.

The stroke-information receiving module 110 is connected to the stroke dividing module 120. The stroke-information receiving module 110 receives handwriting information. The handwriting information (hereinafter, also referred to as stroke information) includes at least position information of the handwriting. The position information refers to information indicating a position in a predetermined coordinate system, such as a coordinate system of a medium, such as paper or a touch panel, on which writing is performed, or a coordinate system configured with multiple writing media. The position information may be expressed using absolute coordinates, or may be expressed using relative coordinates. The stroke information may be divided into sets of information regarding a single stroke, and may include time information corresponding to position information (or may be sequence information indicating the sequence of the position information), or information indicating a starting point and an endpoint of one piece of handwriting, such as pen-up/down information as described below.

The stroke dividing module 120 is connected to the stroke-information receiving module 110 and the overlap determining module 130. When stroke information received by the stroke-information receiving module 110 has not been divided into sets of information regarding a single stroke, the stroke dividing module 120 divides the stroke information into sets of information regarding a single stroke from the time information corresponding to the position information or the information indicating a starting point and an endpoint of one piece of handwriting.

When stroke information received by the stroke-information receiving module 110 has been divided into sets of information regarding a single stroke, the stroke dividing module 120 performs no processes. In this case, the stroke dividing module 120 is unnecessary, and the image processing apparatus according to the first exemplary embodiment may have a configuration in which the stroke dividing module 120 is not included and the overlap determining module 130 receives stroke information from the stroke-information receiving module 110.

The overlap determining module 130 is connected to the stroke dividing module 120, the stroke separating module 140, and the rasterizing module 150A. The overlap determining module 130 determines whether or not first handwriting and second handwriting overlap each other on the basis of the stroke information which is received by the stroke-information receiving module 110 (including stroke information obtained by dividing the stroke information into sets of information regarding a single stroke by the stroke dividing module 120). The overlap determining module 130 sends the stroke information of the first handwriting and that of second handwriting which have been determined to overlap each other, to the stroke separating module 140 and sends the stroke information of handwriting which has been determined not to overlap other handwriting, to the rasterizing module 150A.

More specifically, the overlap determining module 130 may determine whether or not first handwriting and second handwriting overlap each other by determining whether or not the distance between the first handwriting and the second handwriting is equal to or less than a predetermined value.

The stroke separating module 140 is connected to the overlap determining module 130 and the rasterizing module 150B. When the overlap determining module 130 has determined that the first handwriting and the second handwriting overlap each other, the stroke separating module 140 changes the first stroke information or the second stroke information so as to separate the first handwriting from the second handwriting.

More specifically, the stroke separating module 140 may change the orientation information and/or the position information in the stroke information of the first handwriting or the second handwriting on the basis of a predetermined value or a random number until the overlap determining module 130 determines that these pieces of handwriting do not overlap each other.

Alternatively, the stroke separating module 140 may change the position information in the stroke information of the first handwriting or the second handwriting so as to move the position in the direction orthogonal to the first handwriting or the second handwriting.

The rasterizing module 150A is connected to the overlap determining module 130 and the image composing module 160. The rasterizing module 150A generates an image from the stroke information of the handwriting which has been determined not to overlap other handwriting by the overlap determining module 130. That is, the rasterizing module 150A performs a so-called rasterizing process.

The rasterizing module 150B is connected to the stroke separating module 140 and the image composing module 160. The rasterizing module 150B generates an image from the stroke information of the handwriting obtained through the separation by the stroke separating module 140.

The image composing module 160 is connected to the rasterizing module 150A, the rasterizing module 150B, and the offline recognizing module 170. The image composing module 160 composes an image from the images generated by the rasterizing module 150A and the rasterizing module 150B. Accordingly, the composed image generated in this module is an image in which the pieces of the handwriting that are in the stroke information received by the stroke-information receiving module 110 and that have overlapped each other are separated from each other.

In other words, by using the rasterizing module 150A, the rasterizing module 150B, and the image composing module 160, an image is generated from the stroke information of the handwriting which is separated from other handwriting by the stroke separating module 140 and the stroke information of the handwriting which has been determined not to overlap other handwriting by the overlap determining module 130.

The offline recognizing module 170 is connected to the image composing module 160 and the output module 180. The offline recognizing module 170 performs recognition on the image generated by the image composing module 160. This is so-called image recognition, and is, for example, character recognition in this case. Techniques of related art are used for image recognition or character recognition.

The output module 180 is connected to the offline recognizing module 170. The output module 180 outputs the recognition results obtained by the offline recognizing module 170, such as text data, character sizes (font sizes), and positions of characters. The outputting of the recognition results includes, for example, the following: writing of the recognition results, which may be attached to the image generated by the image composing module 160, into a document storage apparatus such as a document database; storing of the recognition results into a storage medium such as a memory card; sending of the recognition results to other information processing apparatuses; and displaying of the recognition results on a display apparatus such as a display.

Figure 2:
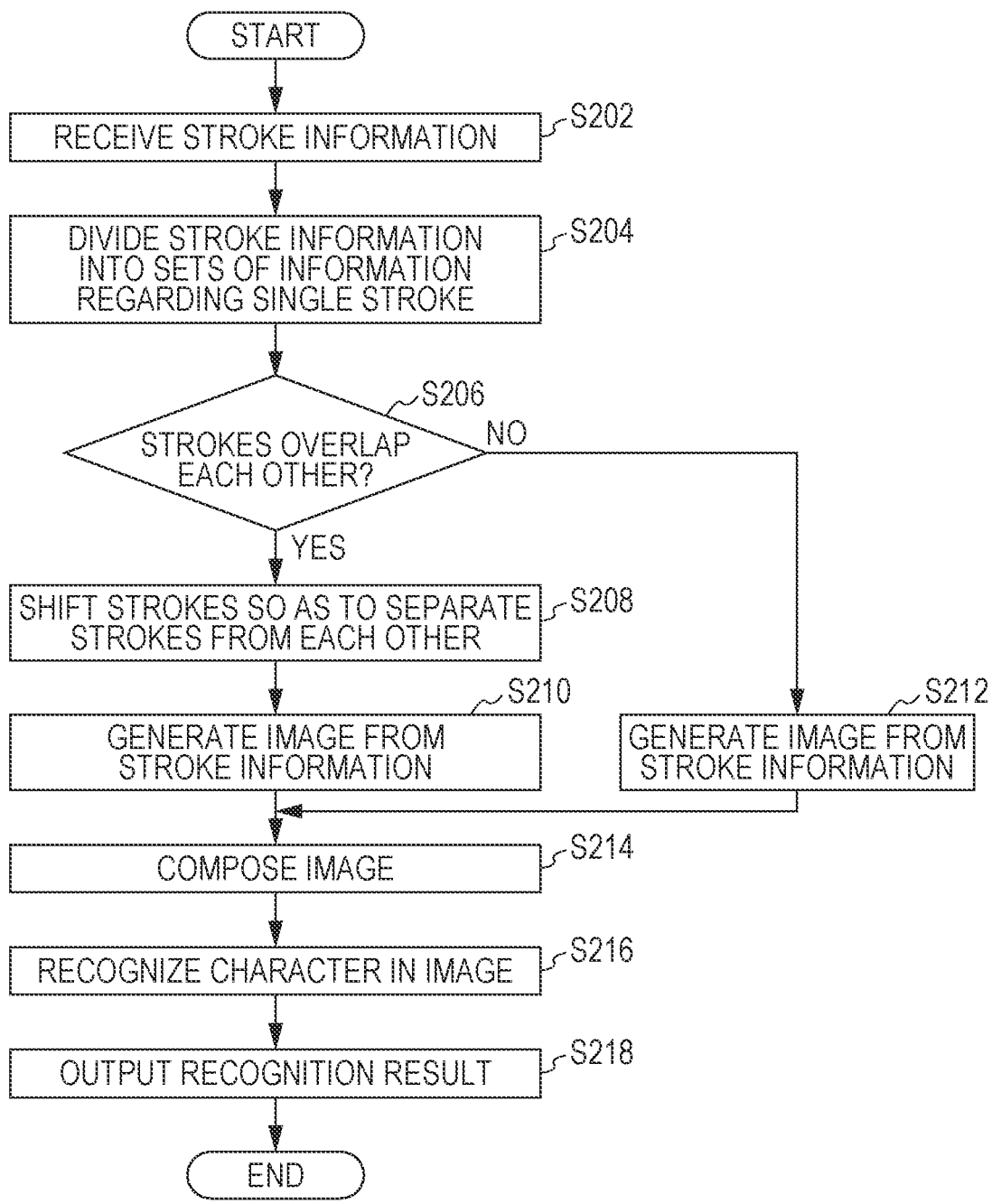
FIG. 2 is a flowchart of an exemplary process according to the first exemplary embodiment.

FIG. 2 is a flowchart of an exemplary process according to the first exemplary embodiment. The detailed description will be made with reference to the examples in FIGS. 3 to 16C.

In step S202, the stroke-information receiving module 110 receives stroke information.

The stroke information represents, for example, a character which is written on a touch panel (also referred to as a digitizer, a tablet, or the like), paper, or the like through an operation by an operator using a pen (including an electronic pen), a finger, or the like. For example, an action of a pen, a finger, or the like on a touch panel is detected, and stroke information which represents the action is generated. Alternatively, an action of a pen or the like, which includes an acceleration sensor or the like, on paper may be detected, and stroke information may be generated. Alternatively, an information image on which, for example, position information is described (for example, a glyph code disclosed in Japanese Unexamined Patent Application Publication No. 06-75795) may be read out from paper or the like on which the information image is printed, by using a pen or the like including an image reading apparatus, and may be analyzed so that stroke information is generated.

Figure 3:
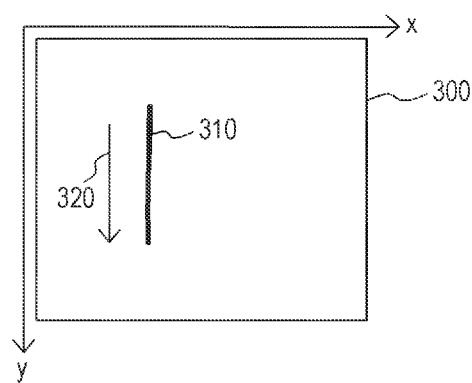
FIG. 3 is a diagram for explaining exemplary stroke information.
Figure 6E:
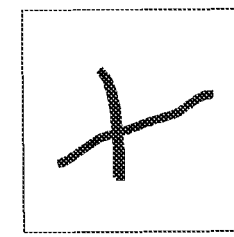
FIGS. 6A to 6E are diagrams for explaining exemplary states in which strokes overlap each other.
Figure 6D:
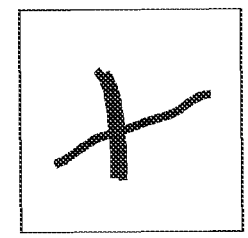
Figure 6C:
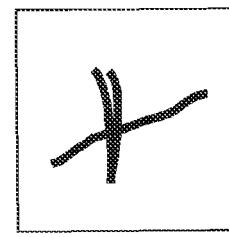
Figure 6B:
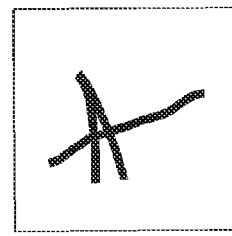
Figure 6A:
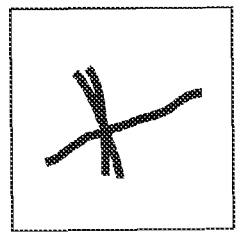
Figure 7:
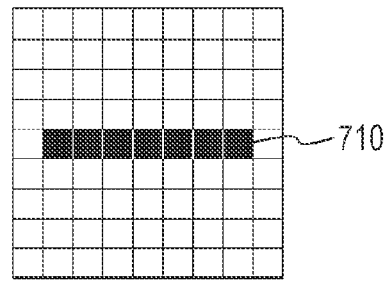
FIG. 7 is a diagram for explaining an exemplary process of determining whether strokes overlap each other.

FIG. 3 is a diagram for explaining exemplary stroke information. Assume that handwriting 310 is written from upward to downward (in a handwriting direction 320) by using an electronic pen on a tablet 300. In the coordinate system in FIG. 3, an origin is the upper left corner of the tablet 300; the x coordinate is oriented in the right direction; and the y coordinate is oriented downward. Examples of the stroke information of this handwriting 310 are illustrated, for example, in stroke information 400A to 400C. FIGS. 4A to 4C are diagrams for explaining exemplary data configurations of the stroke information 400A to 400C. The stroke information 400A, for example, has a coordinates column 410A and a time column 420A. The coordinates column 410A stores coordinates information of the handwriting 310. The time column 420A stores time when the coordinates are detected. When coordinates are detected at equal time intervals, the time intervals in the time column 420A are equal. Instead, the stroke information may have a data structure as in the stroke information 400B. The stroke information 400B has a coordinates column 410B and a pen up/down column 420B. The coordinates column 410B stores coordinates information of the handwriting 310. The pen up/down column 420B stores an action of an electronic pen at the time when the coordinates are detected, i.e., "down" indicating that the electronic pen touches the tablet 300, which indicates that the writing is started, that is, a starting point, or "up" indicating that the electronic pen goes up from the tablet 300, which indicates that the writing is finished, that is, an endpoint. The stroke information 400C has a coordinates column 410C, a time column 420C, and a pen up/down column 430C. The coordinates column 410C is equivalent to the coordinates column 410A; the time column 420C is equivalent to the time column 420A; and the pen up/down column 430C is equivalent to the pen up/down column 420B.

In step S204, the stroke dividing module 120 divides the stroke information into sets of information regarding a single stroke. The stroke dividing module 120 divides the stroke information on the basis of the time information (or up/down information of a pen), that is, divides the stroke information into sets of information regarding a single stroke. One stroke (writing) is represented by a coordinates information set which includes the coordinates information from the starting point to the endpoint of the writing.

FIGS. 5A and 5B are diagrams for explaining exemplary processes of extracting one stroke. In the case of the stroke information 400A illustrated in the example in FIG. 5A, the stroke information is divided at such a point that a distance between target coordinates and the following coordinates in the coordinates column 410A is equal to or more than a predetermined value. Alternatively, the stroke information may be divided at such a point that a distance between target coordinates and the following coordinates is equal to or less than the predetermined value, but the interval of the corresponding time information in the time column 420A is equal to or more than a predetermined value. Thus, the stroke information 400A is divided into, for example, a stroke unit 510A and a stroke unit 520A. The stroke information 400B illustrated in the example in FIG. 5B is divided into sets of information regarding a single stroke, each of which includes information ranging from "down" to "up" in the pen up/down column 420B. Thus, the stroke information 400B is divided into, for example, a stroke unit 510B and a stroke unit 520B.

In step S206, the overlap determining module 130 determines whether or not strokes overlap each other. When the strokes overlap each other, the process proceeds to step S208. Otherwise, the process proceeds to step S212.

FIGS. 6A to 6E are diagrams for explaining exemplary states in which strokes overlap each other. Each of the examples in FIGS. 6A to 6E illustrates a character constituted by three strokes. When an image is generated from the information regarding these strokes and character recognition is performed on the generated image, this character is often recognized as a character "+". A state in which strokes overlap each other may refer to a case where a stroke overlies another stroke as in the example in FIG. 6A, a case where a stroke is in contact with another stroke side by side as in the example in FIG. 6B, a case where a stroke is in contact with another stroke in a portion that corresponds to a predetermined value or more as in the example in FIGS. 6C and 6D, or a case where a distance between two strokes is equal to or less than a predetermined value and the two strokes intersect with each other as in the example in FIG. 6E.

The overlap determining module 130 determines whether or not strokes overlap each other by determining whether or not a distance between the strokes is equal to or less than a predetermined value.

For example, specific methods for determining whether or not strokes overlap each other are as follows.

(A1) A stroke (line segment) is expanded (made thicker), and when another stroke is included in the expanded region, it is determined that the strokes overlap each other.

Figure 8:
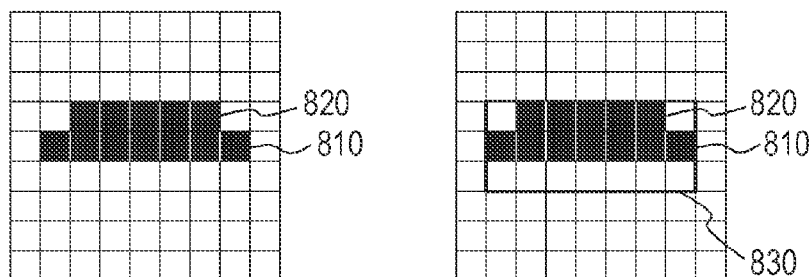
FIG. 8 includes diagrams for explaining an exemplary process of determining whether strokes overlap each other.

Exemplary processes of determining whether strokes overlap each other will be described in detail with reference to the examples in FIGS. 7 to 10. The coordinates information is represented by dot information, pieces of which are aligned as in a stroke 710 illustrated in the example in FIG. 7. Each piece of the dot information is expanded by one pixel on each of the upward and downward sides thereof in the y axis direction. That is, it is assumed that the stroke has a line width of three pixels. When a different stroke is included in this expanded region, these strokes are determined to overlap each other. A case where a stroke 810 and a stroke 820 are in contact with each other as illustrated in the example in FIG. 8 will be described. If the target stroke is the stroke 810, when the stroke 810 is expanded by one pixel on each of the upward and downward sides thereof in the y axis direction, an expanded region 830 in the example in FIG. 8 is obtained. Since the stroke 820 is included in the expanded region 830, the strokes 810 and 820 are determined to overlap each other. Alternatively, when a ratio of an area in which the stroke 820 is included in the expanded region 830 with respect to the area of the stroke 810 or the stroke 820 is equal to or more than a predetermined ratio, it may be determined that the strokes 810 and 820 overlap each other.

Figure 9:
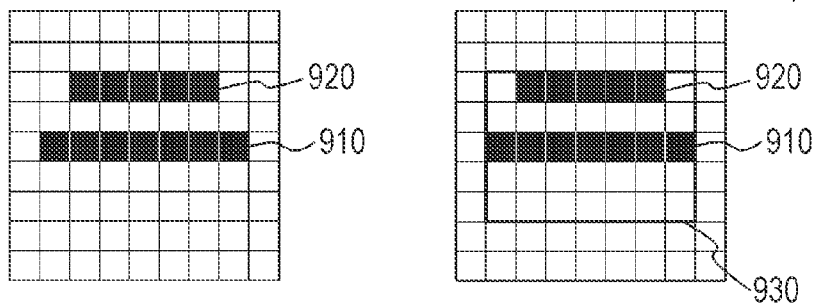
FIG. 9 includes diagrams for explaining an exemplary process of determining whether strokes overlap each other.
Figure 10:
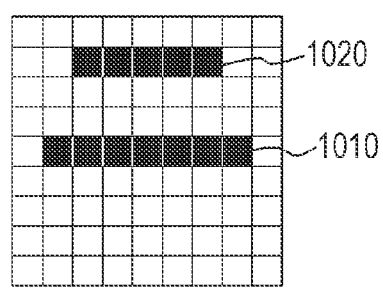
FIG. 10 is a diagram for explaining an exemplary process of determining whether strokes overlap each other.

Then, the stroke 810 is further expanded by one pixel on each of the upward and downward sides thereof in the y axis direction. That is, the stroke 810 is expanded by two pixels in total on each of the upward and downward sides thereof, so that it is assumed that the line width of the stroke 810 is five pixels. When a different stroke is included in this expanded region, these strokes are determined to overlap each other. A case where a stroke 910 and a stroke 920 are spaced one pixel apart as illustrated in the example in FIG. 9 will be described. If the target stroke is the stroke 910, when the stroke 910 is expanded by two pixels on each of the upward and downward sides thereof in the y axis direction, an expanded region 930 in the example in FIG. 9 is obtained. Since the stroke 920 is included in the expanded region 930, the strokes 910 and 920 are determined to overlap each other. Alternatively, when a ratio of an area in which the stroke 920 is included in the expanded region 930 with respect to the area of the stroke 910 or the stroke 920 is equal to or more than a predetermined ratio, it may be determined that the strokes 910 and 920 overlap each other.

When strokes are spaced two pixels or more apart, it is determined that the strokes do not overlap each other. As illustrated in the example in FIG. 10, when the target stroke is a stroke 1010, since a stroke 1020 is not included in the above-described expanded region, these strokes are determined not to overlap each other.

The examples have been described above in which a value to be used for the extension (predetermined value) is up to two pixels. This predetermined value may be another value. In the above-described examples, a stroke is expanded on both the upward and downward sides thereof in the y axis direction. However, the extension may be made on both the left and right sides of a stroke in the x axis direction. Furthermore, the extension may be made in both the axis directions. Moreover, horizontally oriented strokes may be expanded on both the upward and downward sides thereof in the y axis direction; vertically oriented strokes may be expanded on both the left and right sides thereof in the x axis direction; and other strokes may be expanded in both the axis directions. The determination of whether a stroke is horizontally or vertically oriented may be made by using stroke information to compute a ratio between the height and the width of a circumscribed rectangle that surrounds the stroke and compare the computed ratio to a predetermined value.

(A2) A region having a predetermined size is searched sequentially starting from an end of a stroke, and when another stroke is included in the region, these strokes are determined to be overlap each other.

The description will be made with reference to the example in FIG. 11. A determination of whether or not a pair of coordinates of a stroke 1110 matches a pair of coordinates of a stroke 1120 is sequentially made starting from a starting point (a black point 1) to an endpoint (a black point 19) of the stroke 1110 (for example, the determination may be made every x points of the stroke 1110, where x is predetermined). Referring to the stroke information of the stroke 1110, the determination is made starting from a starting point (a target pixel/the black point 1) in a raster image, and when a pixel of the other stroke 1120 (in the example in FIG. 11, a diagonally shaded pixel) which is different from the target pixel is present in an area that is obtained by, for example, expanding the target pixel by two pixels in each of the upward, downward, left, and right directions (for example, a region 1130, a region 1140, and the like, that is, a composed region 1150 which is composed from these regions), this different pixel is determined to be a "provisional matched-coordinates pixel". The above-described process is performed on pixels until the endpoint of the target stroke 1110 is processed (i.e., the black point 1, a black point 2, . . . , the black point 19). When "provisional matched-coordinates pixels" are located on an identical stroke (in the example in FIG. 11, on the stroke 1120) and the cumulative total of the "provisional matched-coordinates pixels" (which are not required to be continuously located) is equal to or larger than a number corresponding to a predetermined ratio (for example, 50%) of pixels of either of the stroke 1110 and the stroke 1120, the strokes 1110 and 1120 are determined to overlap each other. As a value for the area size (a predetermined value) in the above-described example, an exemplary area that is obtained by expanding a target pixel by two pixels in each of the upward, downward, left, and right directions is illustrated. However, other values may be used.

A second stroke to be used in these two types of the determination may be limited to the previous or next stroke of a first stroke in stroke order. This is because the overlap often occurs when a stroke following another stroke is written.

In step S208, the stroke separating module 140 shifts strokes so as to separate the strokes from each other. This process is performed when it has been determined that the strokes overlap each other in step S206. In other words, this process is performed so that after the rasterizing module 150B generates an image, the offline recognizing module 170 performs a recognition process on the generated image having separated line segments.

FIGS. 12A to 12C are diagrams for explaining an exemplary process of separating strokes from each other. As illustrated in the example in FIG. 12A, three strokes, i.e., a stroke 1210A, a stroke 1220A, and a stroke 1230A, are present, and it is determined that the strokes 1210A and 1220A overlap each other. The example in FIG. 12B indicates a state in which the stroke 1210A is shifted upward. That is, three strokes are present, i.e., a stroke 1210B obtained by shifting the stroke 1210A, a stroke 1220B which is equivalent to the stroke 1220A, and a stroke 1230B which is equivalent to the stroke 1230A. Specifically, the coordinates information (coordinates information 1250 illustrated in the example in FIG. 12C) of the stroke information of the stroke 1210A is converted so that the obtained coordinates are $(x_i+\alpha, y_i+\beta)$. Here, $\alpha$ represents a shift amount in the x axis direction, $\beta$ represents a shift amount in the y axis direction, and these values may be minus.

For example, methods as specific processes of separating strokes are as follows.

(B1) A stroke is shifted on a random basis (including use of pseudo random numbers) until the stroke does not overlap another stroke. That is, $\alpha$ and $\beta$ described above may be made random.

Figure 13B:
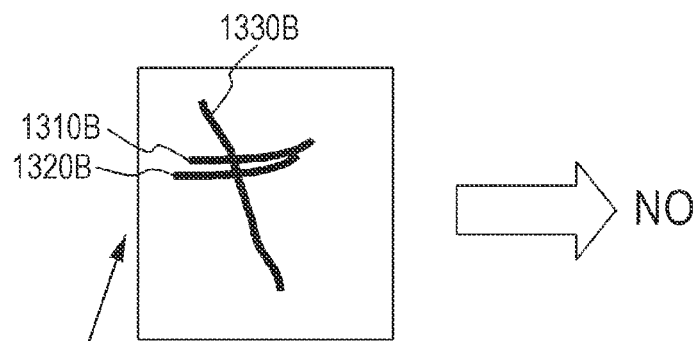
FIGS. 13A to 13D are diagrams for explaining an exemplary process of separating strokes from each other.
Figure 13A:
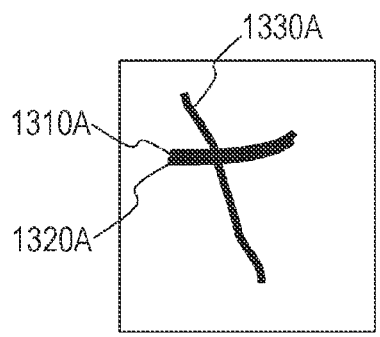
Figure 13C:
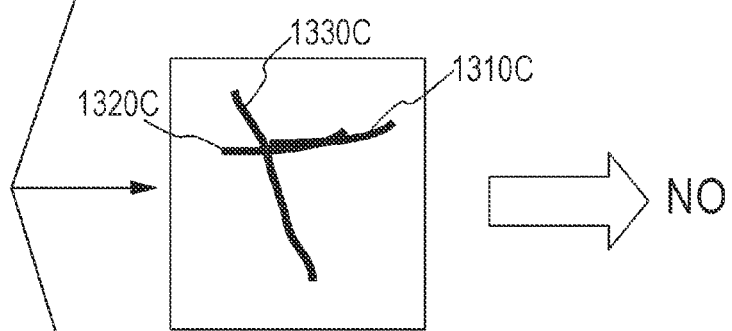
Figure 13D:
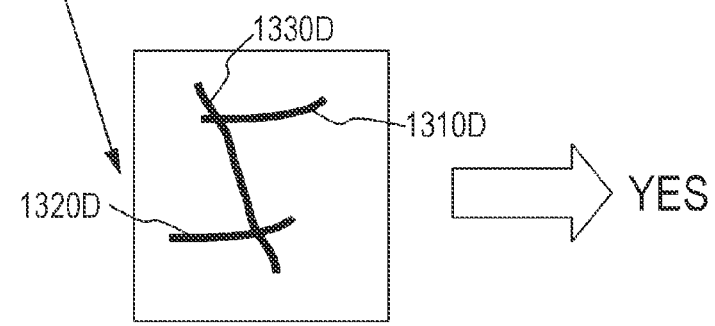

The description will be made with reference to the examples in FIGS. 13A to 13D. The example in FIG. 13A indicates a state in which strokes have been determined to overlap each other. The example in FIG. 13B is obtained by shifting a stroke 1310A on a random basis, and the determination process that is equivalent to that in step S206 is performed on the example in FIG. 13B. The determination result is that a stroke 1310B and a stroke 1320B still overlap each other. Accordingly, the stroke 1310A is shifted again on a random basis. The example in FIG. 13C indicates the obtained result, and the determination process that is equivalent to that in step S206 is performed on the example in FIG. 13C. The determination result is that a stroke 1310C and a stroke 1320C still overlap each other. Accordingly, the stroke 1310A is shifted again on a random basis. The example in FIG. 13D indicates the obtained result, and the determination process that is equivalent to that in step S206 is performed on the example in FIG. 13D. The determination result is that a stroke 1310D and a stroke 1320D do not overlap each other. When such a state is obtained, the process in the next step S210 is performed.

(B2) A stroke is shifted by a predetermined number of pixels in a predetermined direction until the stroke does not overlap another stroke. The description will be made with reference to the examples in FIGS. 14A to 14C. The example in FIG. 14A indicates a state before a shifting process is performed, in which a stroke 1410A and a stroke 1420A have been determined to overlap each other. Accordingly, the process of shifting the stroke 1410A or the stroke 1420A is performed.

(B2-1) Shifting processes are performed in which one of the strokes is fixed and the other stroke is shifted by a predetermined value (for example, one pixel) in the upward, downward, left, right, and diagonal directions in this sequence. After each of the shifting processes (for example, one pixel in the upward direction) is performed, the determination process that is equivalent to that in step S206 is performed. When the determination result is that the strokes do not overlap each other, the shifting processes are ended. The sequence of the directions in which shifting is performed is predetermined. However, any sequence other than that of the upward, downward, left, right, and diagonal directions may be employed. The target of the shifting processes may be an original stroke, i.e., a stroke which is not subjected to any conversion after the stroke-information receiving module 110 has received the stroke. Alternatively, a stroke obtained through the shifting processes may be cumulatively subjected to the following shifting processes. A distance with which the shifting is performed may be increased (or decreased) when one cycle of the directions in which the shifting processes are preformed is finished.

Figure 14A:
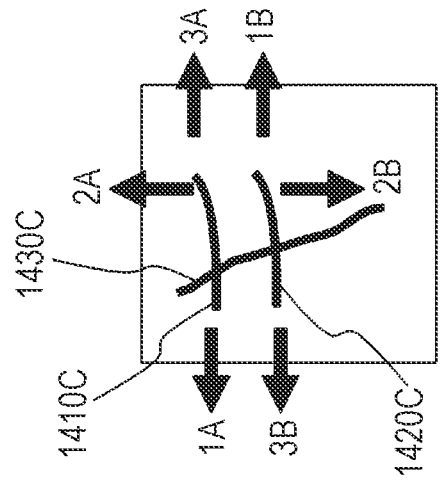
FIGS. 14A to 14C are diagrams for explaining an exemplary process of separating strokes from each other.
Figure 14B:
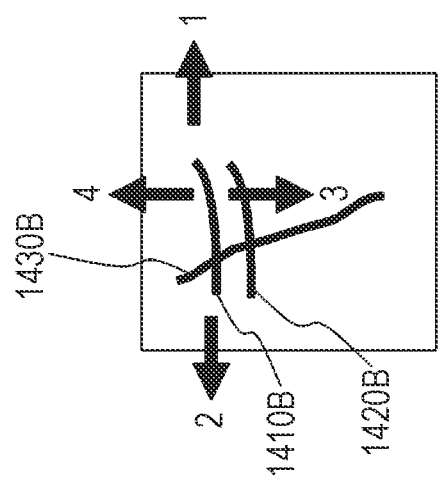

As illustrated in the example in FIG. 14B, a stroke 1410B is shifted in the right, left, downward, and upward directions in this sequence. Whenever the shifting is performed, it is determined whether or not the stroke 1410B and a stroke 1420B overlap each other.

(B2-2) Shifting processes are performed in which multiple target strokes are shifted by a predetermined value (for example, one pixel) in the upward, downward, left, right, and diagonal directions in this sequence in such a manner that the directions in which the target strokes are shifted are symmetrical (for example, one stroke is shifted in the upward direction and the other stroke in the downward direction). After each of the shifting processes (for example, one pixel in the upward direction and one pixel in the downward direction) is performed, the determination process that is equivalent to that in step S206 is performed. When the determination result is that the strokes do not overlap each other, the shifting processes are ended. The sequence of the directions in which shifting is performed is predetermined. However, any sequence other than that of the upward, downward, left, right, and diagonal directions may be employed. The target of the shifting processes may be an original stroke, i.e., a stroke which is not subjected to any conversion after the stroke-information receiving module 110 has received the stroke. Alternatively, a stroke obtained through the shifting processes may be cumulatively subjected to the following shifting processes. A distance with which the shifting is performed may be increased (or decreased) when one cycle of the directions in which the shifting processes are preformed is finished.

Figure 14C:
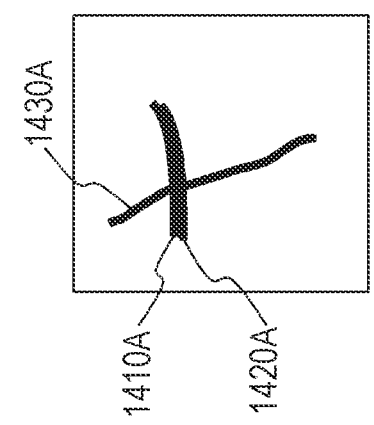

As illustrated in the example in FIG. 14C, a stroke 1410C is shifted in the left direction and a stroke 1420C is shifted in the right direction; then, the stroke 1410C is shifted in the upward direction and the stroke 1420C is shifted in the downward direction; and then, the stroke 1410C is shifted in the right direction and the stroke 1420C is shifted in the left direction. Whenever the shifting is performed, it is determined whether or not the strokes 1410C and 1420C overlap each other.

(B3) A stroke is shifted in a direction that is orthogonal to the stroke.

(B3-1) An equation for a straight line (y=ax+b) is obtained from the starting point and the endpoint of each of the strokes that have been determined to overlap each other in step S206, and the stroke is shifted parallel to itself in a direction that is orthogonal to the line (a'=−1/a). One stroke may be shifted and the other may be fixed, or both strokes may be shifted in opposite directions. The distance with which the shifting is performed is set to a predetermined value. When both strokes are shifted, the same distance may be used for the shifting of the strokes, or different distances may be used for the shifting. After the strokes are shifted, the determination process that is equivalent to that in step S206 is performed. When the determination result is that the strokes do not overlap each other, the shifting process is ended. When the determination result is that the strokes overlap each other, the distance with which the shifting is performed is increased.

(B3-2) The x coordinates which are included in the coordinates information of strokes that have been determined to overlap each other in step S206 are compared with each other, and the y coordinates of the strokes are compared with each other, whereby the location relationship of the strokes (i.e., which stroke is located upward or downward, or on the left or the right) is detected. Then, the strokes are shifted in symmetrical directions in such a manner that a stroke located upward is shifted in the upward direction, a stroke located downward is shifted in the downward direction, a stroke located on the right is shifted in the right direction, and a stroke located on the left is shifted in the left direction. One stroke may be shifted and the other may be fixed, or both strokes may be shifted in opposite directions. The distance with which the shifting is performed is set to a predetermined value. When both strokes are shifted, the same distance may be used for the shifting of the strokes, or different distances may be used for the shifting. After the strokes are shifted, the determination process that is equivalent to that in step S206 is performed. When the determination result is that the strokes do not overlap each other, the shifting process is ended. When the determination result is that the strokes overlap each other, the distance with which the shifting is performed is increased.

Figure 15A:
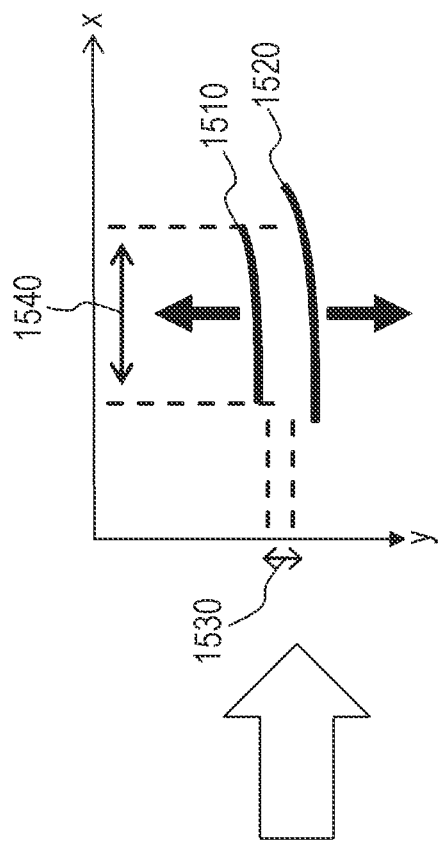
FIGS. 15A and 15B are diagrams for explaining an exemplary process of separating strokes from each other.
Figure 15B:
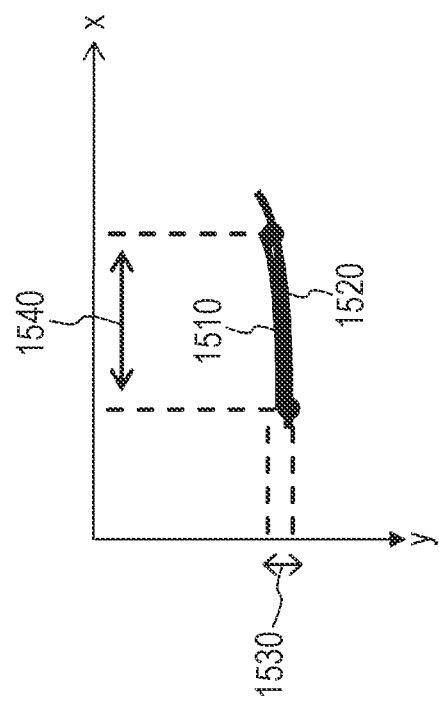

The description will be made with reference to the examples in FIGS. 15A to 15B. The example illustrated in FIG. 15A indicates a state in which a stroke 1510 and a stroke 1520 have been determined to overlap each other. When the x coordinates of the strokes 1510 and 1520 are compared with each other and the y coordinates are compared with each other, it is determined that the stroke 1510 is located on the upward side and the stroke 1520 is located on the downward side. The area in which the comparison is made may be an area in a circumscribed rectangle of one of the strokes. In the example in FIG. 15A, pieces of coordinates information of strokes that are present in the circumscribed rectangle of the stroke 1510 (an area indicated by a vertical direction distance 1530 and a horizontal direction distance 1540) are compared with each other, whereby the location relationship between the two strokes is detected. Then, as illustrated in the example in FIG. 15B, the stroke 1510 is shifted upward and the stroke 1520 is shifted downward, so that the strokes 1510 and 1520 are separated from each other.

In step S210, the rasterizing module 150B generates an image from the stroke information.

FIGS. 16A to 16C are diagrams for explaining an exemplary process of generating an image from the stroke information. The rasterizing module 150B generates an image illustrated in the example in FIG. 16C, by using stroke information 1600A illustrated in the example in FIG. 16A or stroke information 1600B illustrated in the example in FIG. 16B. The stroke information 1600A is equivalent to the stroke information 400A illustrated in the example in FIG. 4A, and the stroke information 1600B is equivalent to the stroke information 400B illustrated in FIG. 4B. However, the stroke information 1600A and the stroke information 1600B include stroke information obtained after the stroke that overlapped another stroke is shifted. An image may be generated in accordance with the coordinates information in a coordinates column 1610A or a coordinates column 1610B by making a pixel that corresponds to the coordinates of the coordinates information turn black in the image. When a stroke is to be made thicker, coordinates in a region having a predetermined size (for example, a rectangle of 2×2 pixels, a rectangle of 3×3 pixels, or a circle having a radius of three pixels) may be plotted.

In step S212, the rasterizing module 150A generates an image from the stroke information. This process is equivalent to that in step S210. However, the stroke information used in this step is stroke information of a stroke that has been determined not to overlap another stroke in step S206.

In step S214, the image composing module 160 composes an image. That is, an image is composed from the images generated in step S210 and step S212.

In step S216, the offline recognizing module 170 recognizes a character in the image.

In step S218, the output module 180 outputs the recognition result.

Figure 17:
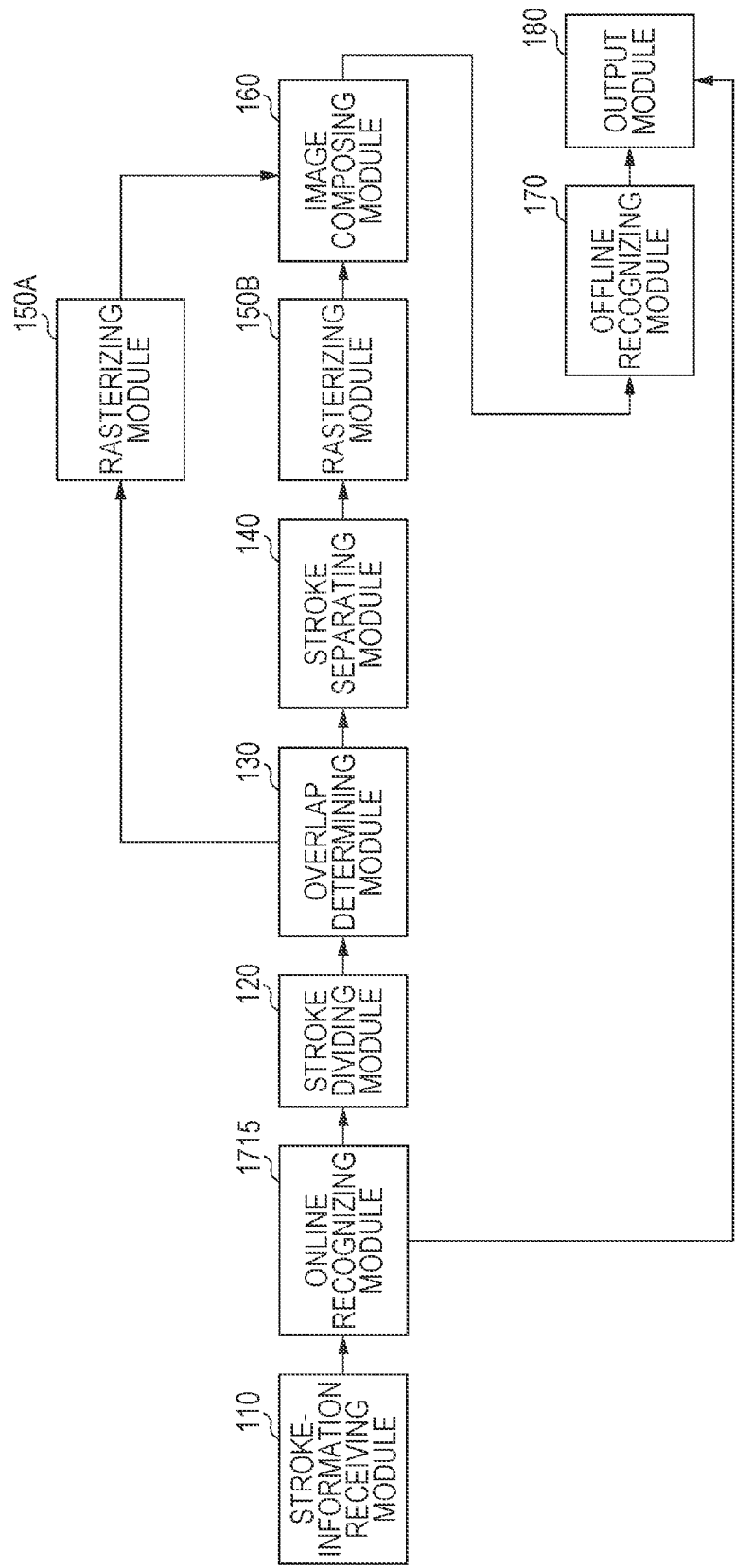
FIG. 17 is a schematic module configuration diagram illustrating an exemplary configuration according to a second exemplary embodiment of the invention.

FIG. 17 is a schematic module configuration diagram illustrating an exemplary configuration according to a second exemplary embodiment of the invention.

The image processing apparatus according to the second exemplary embodiment performs recognition on handwriting information, generates an image from the handwriting information which has not been recognized or whose recognition result has a probability that is equal to or less than a predetermined value, and recognizes the generated image. As illustrated in the example in FIG. 17, the image processing apparatus includes the stroke-information receiving module 110, an online recognizing module 1715, the stroke dividing module 120, the overlap determining module 130, the stroke separating module 140, the rasterizing module 150A, the rasterizing module 150B, the image composing module 160, the offline recognizing module 170, and the output module 180. The image processing apparatus according to the second exemplary embodiment is one obtained by adding the online recognizing module 1715 to that according to the first exemplary embodiment. The same types of components as those in the first exemplary embodiment are denoted by the same reference characters and will not be described.

The stroke-information receiving module 110 is connected to the online recognizing module 1715.

The online recognizing module 1715 is connected to the stroke-information receiving module 110, the stroke dividing module 120, and the output module 180. The online recognizing module 1715 performs recognition on handwriting on the basis of the stroke information received by the stroke-information receiving module 110, that is, performs so-called online character recognition. Technology of related art is used for the online character recognition. A description will be made with reference to FIGS. 18A, 18B, and 19 by taking an example of performing recognition on a Japanese katakana "ki" as illustrated below.

キ

Online character recognition is often performed by using stroke order. Accordingly, in the case where a character is written in wrong stroke order, even when the character has a shape which the character is to have, the character might not be recognized. As illustrated in the example in FIG. 18A, when the character is written in the stroke order of (1), (2), and (3), it is possible to correctly recognize the character by online character recognition (see the table illustrated in the example in FIG. 19), whereas as illustrated in the example in FIG. 18B, when the character is written in the stroke order of (4), (5), and (6), the character might not be correctly recognized by online character recognition or the probability of the recognition result might be low (see the table illustrated in the example in FIG. 19).

The online recognizing module 1715 sends, to the output module 180, a recognition result that has been obtained through successful recognition or a recognition result that has a probability equal to or more than a predetermined value. The online recognizing module 1715 sends, to the stroke dividing module 120 or the overlap determining module 130, handwriting that has not been recognized (which may be handwriting which the online recognizing module 1715 has determined to have a wrong recognition result, i.e., handwriting that is rejected or out of recognition, or handwriting which is determined to be erroneously recognized through syntactic processing or the like) or stroke information of handwriting that has a probability equal to or less than the predetermined value. For example, stroke information which corresponds to handwriting that is written in wrong stroke order is subjected to the processes of the stroke dividing module 120 and the subsequent modules.

The overlap determining module 130 determines whether or not first handwriting and second handwriting overlap each other, for the handwriting which has not been recognized by the online recognizing module 1715 or the handwriting whose recognition result has a probability equal to or less than the predetermined value. The term "a probability of a recognition result" refers to a probability of the recognition result being correct. Some algorithms for online character recognition not only output a recognition result, but also compute and output a probability of the recognition result. When an algorithm of this type for online character recognition is used, the determination may be made as to whether or not the probability of a recognition result is equal to or less than the predetermined value.

The stroke dividing module 120 is connected to the online recognizing module 1715 and the overlap determining module 130.

The output module 180 is connected to the online recognizing module 1715 and the offline recognizing module 170. The output module 180 outputs the recognition result obtained by the online recognizing module 1715 and the recognition result obtained by the offline recognizing module 170. The output order of the recognition results obtained by the online recognizing module 1715 and the offline recognizing module 170 may be an order based on time information of the stroke information. Specifically, the recognition results may be output in the order in which the writing is made.

Figure 20:
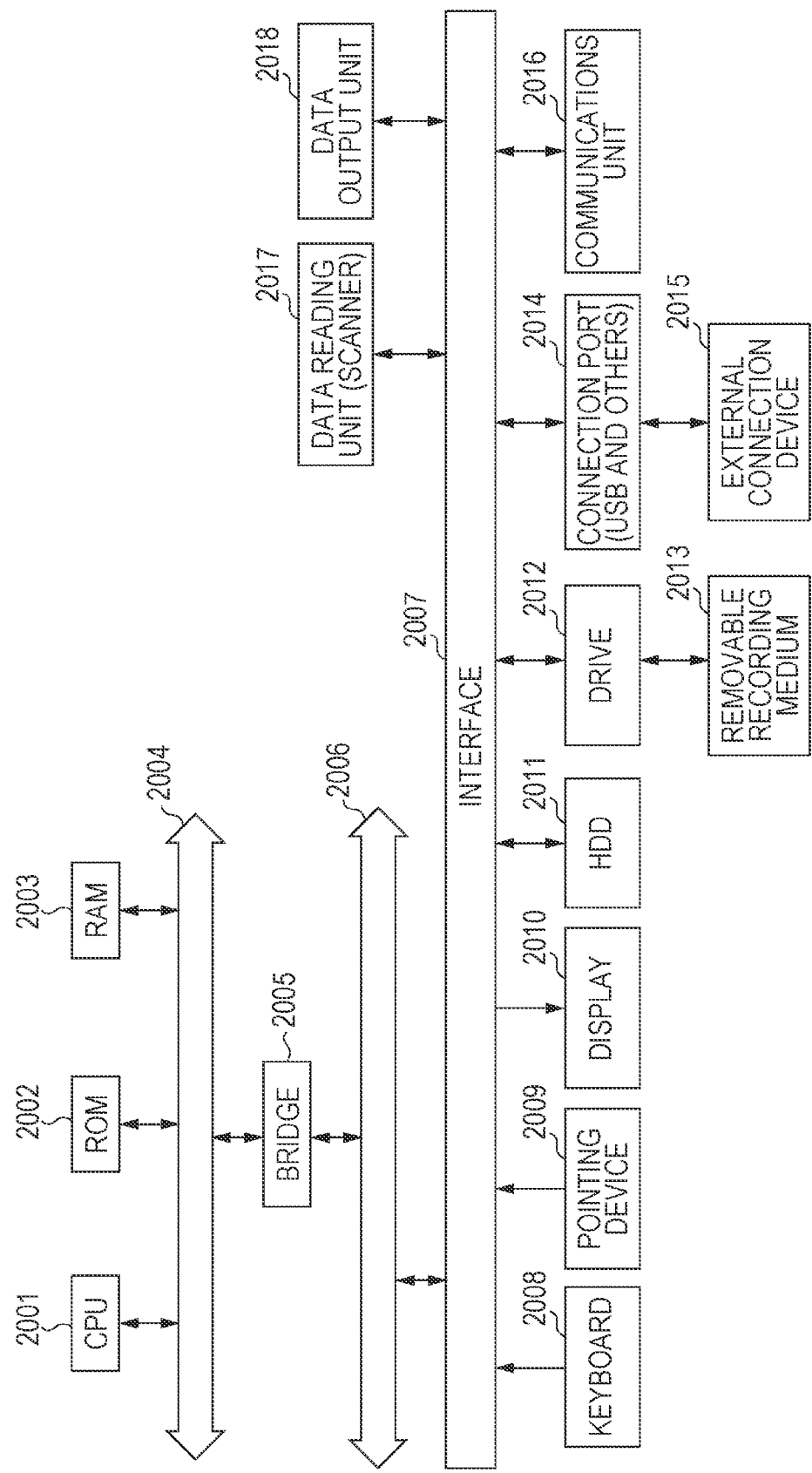
FIG. 20 is a block diagram illustrating an exemplary hardware configuration of a computer in which the exemplary embodiments are implemented.

An exemplary hardware configuration of the image processing apparatuses according to the exemplary embodiments will be described with reference to FIG. 20. The exemplary hardware configuration illustrated in FIG. 20 is configured with, for example, a personal computer (PC), and includes a data reading unit 2017 such as a scanner and a data output unit 2018 such as a printer.

A CPU 2001 is a controller which executes processes according to computer programs which describe execution sequences of various modules described in the above-described exemplary embodiments, i.e., modules such as the stroke-information receiving module 110, the stroke dividing module 120, the overlap determining module 130, the stroke separating module 140, the rasterizing modules 150A and 150B, the image composing module 160, the offline recognizing module 170, the output module 180, and the online recognizing module 1715.

A ROM 2002 stores, for example, programs and computation parameters which are used by the CPU 2001. A RAM 2003 stores, for example, programs used in execution of the CPU 2001 and parameters which are varied as appropriate in the execution. The ROM 2002 and the RAM 2003 are connected to each other via a host bus 2004 which is constituted by, for example, a CPU bus.

The host bus 2004 is connected to an external bus 2006 such as a peripheral component interconnect/interface (PCI) bus via a bridge 2005.

A keyboard 2008 and a pointing device 2009, such as a mouse, a touch panel, or an electronic pen, are input devices which are operated by an operator. A display 2010, such as a liquid crystal display apparatus or a cathode ray tube (CRT), displays a variety of information in the form of text or image information.

A hard disk drive (HDD) 2011 includes a hard disk and drives the hard disk so as to record or reproduce the programs, which are executed by the CPU 2001, and information. The hard disk stores, for example, received handwriting information, and recognition results. The hard disk further stores various computer programs such as other various data processing programs.

A drive 2012 reads out data or programs that are recorded in a removable recording medium 2013, such as a magnetic disk, an optical disk, a magneto-optical disk, or a semiconductor memory, which is attached to the drive 2012, and supplies the data or the programs to the RAM 2003 that is connected via an interface 2007, the external bus 2006, the bridge 2005, and the host bus 2004. The removable recording medium 2013 may be also used as a data record area similar to the hard disk.

A connection port 2014 is used for connection of an external connection device 2015, and includes a connection unit using, for example, the universal serial bus (USB) interface or the IEEE 1394 interface. The connection port 2014 is connected to, for example, the CPU 2001 via the interface 2007, the external bus 2006, the bridge 2005, the host bus 2004, and the like. A communications unit 2016 is connected to communication lines, and communicates data with external sites. The data reading unit 2017 such as a scanner reads documents. The data output unit 2018 such as a printer outputs document data.

The hardware configuration of the image processing apparatus illustrated in FIG. 20 is an exemplary configuration. The configuration according to the exemplary embodiments is not limited to the configuration illustrated in FIG. 20. As long as the configuration is such that it is possible to execute the modules described in the exemplary embodiments, any configuration may be employed. For example, some of the modules may be constituted by specific hardware such as an application specific integrated circuit (ASIC), or some of the modules may be provided in external systems and be connected to the image processing apparatus through communication lines. Furthermore, the systems illustrated in FIG. 20 may be connected to each other via communication lines so as to collaborate with each other. The image processing apparatus may be incorporated in, for example, a copier, a fax, a scanner, a printer, or an all-in-one device (an image processing apparatus which functions as two or more devices including a scanner, a printer, a copier, and a fax).

The programs described above may be provided through a recording medium which stores the programs, or may be provided through a communication unit. In these cases, for example, the programs described above may be interpreted as an invention of "a computer-readable recording medium that stores programs".

The term "a computer-readable recording medium that stores programs" refers to a computer-readable recording medium that stores programs and that is used for, for example, the installation and execution of the programs and the distribution of the programs.

Examples of the recording medium include a digital versatile disk (DVD) having a format of "DVD-recordable (DVD-R), DVD-rewritable (DVD-RW), DVD-random access memory (DVD-RAM), or the like" which is a standard developed by the DVD forum or having a format of "DVD+recordable (DVD+R), DVD+rewritable (DVD+RW), or the like" which is a standard developed by the DVD+RW alliance, a compact disk (CD) having a format of CD read only memory (CD-ROM), CD recordable (CD-R), CD rewritable (CD-RW), or the like, a Blu-ray Disc®, a magneto-optical disk (MO), a flexible disk (FD), a magnetic tape, a hard disk, a ROM, an electrically erasable programmable ROM (EEPROM®), a flash memory, a RAM, and a secure digital (SD) memory card.

The above-described programs or some of them may be stored and distributed by recording them in the recording medium. In addition, the programs may be transmitted through communication, for example, by using a transmission media of, for example, a wired network which is used for a local area network (LAN), a metropolitan area network (MAN), a wide area network (WAN), the Internet, an intranet, an extranet, and the like, a wireless communication network, or a combination of these. Instead, the programs may be carried on carrier waves.

The above-described programs may be included in other programs, or may be recorded on a recording medium along with other programs. Instead, the programs may be stored in multiple recording media by dividing the programs. The programs may be recorded in any format, such as compression or encryption, as long as it is possible to restore the programs.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
at least one non-transitory memory operable to store program code;
at least one processor operable to read said memory and execute said program code, said processor comprising:
a reception unit that receives handwriting information;
a determination unit that determines whether or not first handwriting and second handwriting overlap each other on the basis of the handwriting information received by the reception unit, the first handwriting being indicated by first handwriting information, the second handwriting being indicated by second handwriting information;
a handwriting separation unit that separates the first handwriting from the second handwriting by changing a first handwriting position included in the first handwriting information or a second handwriting position included in the second handwriting information such that the first handwriting at the first handwriting position and the second handwriting at the second handwriting position are moved apart from each other, when the determination unit has determined that the first handwriting and the second handwriting overlap each other;
an image generation unit that generates an image from handwriting information that is obtained through the separation performed by the handwriting separation unit, and information regarding handwriting that has been determined not to overlap other handwriting by the determination unit;
an image recognition unit that recognizes the image generated by the image generation unit; and
an output unit that outputs a recognition result obtained by the image recognition unit,
wherein the handwriting information further comprises time information indicating a time when the first handwriting and the second handwriting are received, and
wherein the determination unit determines whether or not the first handwriting and the second handwriting overlap each other on the basis of the handwriting information including the time information.

2. The image processing apparatus according to claim 1, wherein said processor further comprises:
a handwriting recognition unit that performs recognition on handwriting on the basis of the handwriting information received by the reception unit,
wherein the determination unit determines whether or not first handwriting and second handwriting overlap each other, for handwriting that has not been recognized by the handwriting recognition unit or information regarding handwriting that has a recognition result having a probability equal to or less than a predetermined value, and
wherein the output unit outputs the recognition result obtained by the handwriting recognition unit and the recognition result obtained by the image recognition unit.

3. The image processing apparatus according to claim 1, wherein the determination unit determines whether or not the first handwriting and the second handwriting overlap each other by determining whether or not a distance between the first handwriting and the second handwriting is equal to or less than a predetermined value.

4. The image processing apparatus according to claim 2, wherein the determination unit determines whether or not the first handwriting and the second handwriting overlap each other by determining whether or not a distance between the first handwriting and the second handwriting is equal to or less than a predetermined value.

5. The image processing apparatus according to claim 1, wherein the handwriting separation unit changes at least one of an orientation and a position in the information regarding the first handwriting or the information regarding the second handwriting on the basis of a predetermined value or a random number until the determination unit determines that the first handwriting and the second handwriting do not overlap each other.

6. The image processing apparatus according to claim 2, wherein the handwriting separation unit changes at least one of an orientation and a position in the information regarding the first handwriting or the information regarding the second handwriting on the basis of a predetermined value or a random number until the determination unit determines that the first handwriting and the second handwriting do not overlap each other.

7. The image processing apparatus according to claim 3, wherein the handwriting separation unit changes at least one of an orientation and a position in the information regarding the first handwriting or the information regarding the second handwriting on the basis of a predetermined value or a random number until the determination unit determines that the first handwriting and the second handwriting do not overlap each other.

8. The image processing apparatus according to claim 4, wherein the handwriting separation unit changes at least one of an orientation and a position in the information regarding the first handwriting or the information regarding the second handwriting on the basis of a predetermined value or a random number until the determination unit determines that the first handwriting and the second handwriting do not overlap each other.

9. The image processing apparatus according to claim 1, wherein the handwriting separation unit changes position information in the information regarding the first handwriting or the information regarding the second handwriting in a direction that is orthogonal to the first handwriting or the second handwriting.

10. The image processing apparatus according to claim 2, wherein the handwriting separation unit changes position information in the information regarding the first handwriting or the information regarding the second handwriting in a direction that is orthogonal to the first handwriting or the second handwriting.

11. The image processing apparatus according to claim 3, wherein the handwriting separation unit changes position information in the information regarding the first handwriting or the information regarding the second handwriting in a direction that is orthogonal to the first handwriting or the second handwriting.

12. The image processing apparatus according to claim 4, wherein the handwriting separation unit changes position information in the information regarding the first handwriting or the information regarding the second handwriting in a direction that is orthogonal to the first handwriting or the second handwriting.

13. The image processing apparatus according to claim 1, wherein said processor further comprises an expansion unit that expands lines regarding to both of the first handwriting and the second handwriting in a thickness direction, and wherein the determination unit determines whether or not the first handwriting and the second handwriting overlap each other on the basis of the handwriting information in which the lines are expanded by the expansion unit.

14. A non-transitory computer readable medium storing a program causing a computer to execute a process for image processing, the process comprising:

receiving handwriting information;

determining whether or not first handwriting and second handwriting overlap each other on the basis of the received handwriting information, the first handwriting being indicated by first handwriting information, the second handwriting being indicated by second handwriting information;

separating the first handwriting from the second handwriting by changing a first handwriting position included in the first handwriting information or a second handwriting position included in the second handwriting information such that the first handwriting at the first handwriting position and the second handwriting at the second handwriting position are moved apart from each other, when it has been determined that the first handwriting and the second handwriting overlap each other;

generating an image from handwriting information that is obtained through the separation, and information regarding handwriting that has been determined not to overlap other handwriting;

recognizing the generated image; and outputting a recognition result of the generated image, wherein the handwriting information further comprises time information indicating a time when the first handwriting and the second handwriting are received, and wherein the determination unit determines whether or not the first handwriting and the second handwriting overlap each other on the basis of the handwriting information including the time information.

15. An image processing method comprising:

receiving, performed by at least one processor, handwriting information;

determining, performed by the at least one processor, whether or not first handwriting and second handwriting overlap each other on the basis of the received handwriting information, the first handwriting being indicated by first handwriting information, the second handwriting being indicated by second handwriting information;

separating, performed by the at least one processor, the first handwriting from the second handwriting by changing a first handwriting position included in the first handwriting information or a second handwriting position included in the second handwriting information such that the first handwriting at the first handwriting position and the second handwriting at the second handwriting position are moved apart from each other, when it has been determined that the first handwriting and the second handwriting overlap each other;

generating, performed by the at least one processor, an image from handwriting information that is obtained through the separation, and information regarding handwriting that has been determined not to overlap other handwriting;

recognizing, performed by the at least one processor, the generated image; and outputting, performed by the at least one processor, a recognition result of the generated image, wherein the handwriting information further comprises time information indicating a time when the first handwriting and the second handwriting are received, and wherein the determination unit determines whether or not the first handwriting and the second handwriting overlap each other on the basis of h handwriting information including the time information.

16. The image processing apparatus according to claim 1, wherein the image generation unit generates the image in which the first handwriting position or the second handwriting position has been changed by the handwriting separation unit.

* * * * *